April 30, 1940. G. W. HALL Re. 21,437

TEMPORARY PROTECTIVE COVERING FOR BATHTUBS

Original Filed July 31, 1937

INVENTOR
George W. Hall
BY
Wooster & Davis
ATTORNEYS.

Reissued Apr. 30, 1940

Re. 21,437

UNITED STATES PATENT OFFICE 21,437

TEMPORARY PROTECTIVE COVERING FOR BATHTUBS

George W. Hall, Fairfield, Conn.

Original No. 2,143,267, dated January 10, 1939, Serial No. 156,671, July 31, 1937. Application for reissue January 8, 1940, Serial No. 312,863

13 Claims. (Cl. 4—173)

This invention is an improvement in temporary protective coverings for bathtubs, and is particularly an improvement on the invention disclosed and described in Patent 2,119,210 entitled "Temporary protective covering for bathtubs."

The protective covering disclosed and claimed in the above-named application is intended to be attached to the rough construction before the finished work is applied, and therefore certain parts of the covering are intended to remain in place, between the finished wall and floor and the tub. In certain types of construction, it is desirable for the finished construction to be bonded, or otherwise attached to the tub. This is particularly desirable with the installation of tile walls and floors, so that the cement, or other binding material used in the installation of the tile, may be also bonded to the plumbing fixture, and thereby insure a tight, waterproof joint. It is an object of this invention to provide a temporary protective covering for plumbing fixtures, or similar devices, which may be temporarily secured to the fixture itself and leave a marginal portion of the fixture, which will be later covered by the finished work, exposed for bonding to the finished work.

A second object of this invention is to provide a protective covering which may be quickly and easily attached to a fixture to be protected, and as easily removed therefrom, and which is sufficiently economical of manufacture to make its cost negligible, relative to its advantages.

These, and other objects and advantages of this invention, will be more completely described and disclosed in the following specification, the accompanying drawing, and the appended claims.

Broadly, my invention comprises a covering member conforming approximately to the contour of the fixture to be protected and provided with a continuous strip of gummed paper attached at the outer edge of the covering member and having a portion of the gummed strip exposed beyond the edge of the covering member, whereby the covering member may be temporarily secured on the fixture by means of the gummed strip.

A preferred embodiment of my invention is illustrated in the accompanying drawing, in which.

Referring now to the drawing in detail, in which like numerals refer to like parts throughout.

Figure 1:
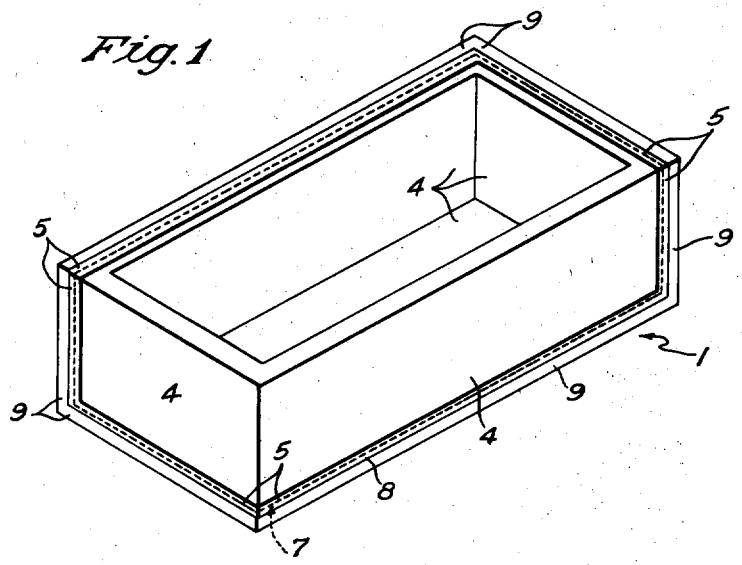
Fig. 1 is a perspective view of a bathtub with the protective covering installed thereon.
Figure 2:
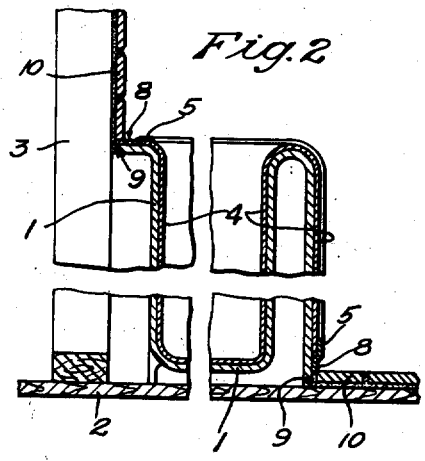
Fig. 2 is a cross sectional view of a construction including a bathtub, with the protective covering and finished work in place.
Figure 3:
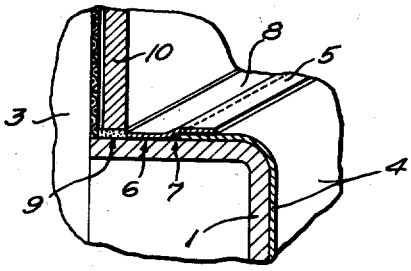
Fig. 3 is an enlarged sectional view illustrating the cooperation of the covering and the gummed strip with the tub and finished work.

A bathtub 1 is set in place on a rough floor 2 and against rough studs 3, in the usual manner. A protective covering member 4, conforming approximately in shape and contour to the tub 1, is placed over the tub 1 to protect the finished surfaces of the tub, as indicated in Fig. 1 and Fig. 2. A continuous strip of material 5, having one surface coated with an adhesive material 6 is secured on the covering 4 at the outer edges thereof, with a portion 8 of the strip 5 extending beyond the outer edge 7 of the covering 4.

The use of the device is extremely simple. First, the surface of the tub, adjacent the rough work, is marked or lined to indicate the surface of the finished work. Then, the covering member 4 is placed over the tub, the exposed portion of the gummed strip moistened, if necessary, and the gummed strip 5 secured on the tub 1 with the edge of the gummed strip on the line of finish work. Installed in this manner, the covering 4 will cover all of the finished surfaces of the tub 1, except a marginal portion 9, adjacent the rough work, which is left exposed for bonding to the finished work 10. When the finished work is completed, the covering 4 and strip 5 may be torn off, or otherwise removed from the tub 1, and, if the strip 5 is damaged in the process of removal, still the covering 4 may be repeatedly used by renewing the strip 5.

The covering 4 is preferably made of heavy waterproof paper, and the strip 5 is preferably the gummed manilla paper strip, commonly used in shipping, mailing, and related occupations. This combination provides a very economical construction, and has been found satisfactory in use, as a protective covering. Other materials may be substituted for the above, when greater durability and permanence of use are desired. An example of such a construction would be a fabric covering, such as that disclosed in the Patent 2,119,210 with the marginal portion adjacent the outer edges treated with rubber cement, or similar non-hardening, or non-setting adhesive.

Whereas, I have illustrated this invention as being applicable to bathtubs, it will be clearly understood by those skilled in the art, that the invention is equally adaptable to other fixtures, such as lavatories, water closets, cabinets, or any other fixtures requiring protection.

What I claim is:

1. A protective covering for a bathtub comprising, a body portion shaped to conform to the shape of the tub and a marginal strip of gummed material secured on said body portion at the outer edges of the body portion and with a continuous longitudinal portion of said marginal strip extending beyond the outer edges of said body portion.

2. A protective covering for a bathtub comprising, a body portion shaped to conform to the outer and inner finished surfaces of said tub, a continuous strip member secured on said body portion and overlapping the outer edges of said body portion, the exposed underside of said strip member having an adhesive substance thereon.

3. In a building structure having a rough floor and walls, and a bathtub set on said floor and against said walls, a covering member for covering and protecting said tub, and means for temporarily securing said covering member on said tub comprising a marginal strip on said cover member provided with an adhesive substance for contacting said tub, the outer edge of said marginal strip being spaced from said floor and said walls to allow for finish on walls and floor.

4. In combination with a bathtub fixture, a protective covering member superposed on said tub and covering both outer and inner surfaces of said tub, a marginal strip on said member provided with an adhesive substance, said marginal strip being secured on said tub with its outer edge spaced from the outer edge of said tub, whereby a marginal strip of said tub adjacent its outer edge is left exposed.

5. In a building structure having a rough floor and walls, and a plumbing fixture set on said floor and against said walls, a temporary protective covering member of heavy waterproof paper superposed on said fixture and conforming in outline to said fixture, a marginal strip of gummed paper attached on said member with a portion of its gummed surface engaged on said fixture, the outer edge of said gummed strip being spaced from the outer edge of said fixture a distance equal to a predetermined thickness of finish work.

6. A protective covering for a bathtub comprising a body portion shaped to conform to the shape of the tub and a marginal strip of gummed material secured on said body portion at the outer edges of the body portion and with a continuous longitudinal portion of said marginal strip arranged for securing outer edges of said body portion to the surface of a tub.

7. A protective covering for a bathtub comprising a body portion shaped to conform to the outer and inner finished surfaces of said tub, a strip member secured on said body portion at the outer edges thereof and extending longitudinally of said edges, and said strip member having an exposed underside having an adhesive substance thereon for securing it to the surface of the tub.

8. A protective covering for a bathtub comprising a body portion shaped to conform to the shape of the tub, and a longitudinally extending marginal strip of adhesive material on said body portion at the outer edges of the body portion for securing the outer edge portion of said body to the surface of a tub.

9. A protective covering for a bathtub comprising a body portion of waterproof paper shaped to conform to the shape of the tub, and a marginal strip of adhesive material secured on said body portion at the outer edges of the body portion, said adhesive strip providing a means for temporarily securing the outer edge portion of said body to the surface of a tub.

10. In a building structure having a rough floor and wall, and a bathtub set on said floor and against said wall, a covering member for covering and protecting said tub, and means for temporarily securing said covering member on said tub comprising a marginal strip of adhesive substance contacting the tub and securing the covering member thereto with the outer edge portions of said member spaced from the floor and wall a distance to allow for finish on said floor and wall.

11. In combination with a bathtub fixture, a protective covering member superposed on said tub and covering both outer and inner surfaces of said tub, a marginal strip of an adhesive substance engaging the surface of the tub and securing the covering member thereto with its outer edge spaced from the outer edge of the tub whereby a marginal strip of said tub adjacent its outer edge is left exposed.

12. In a building structure having a rough wall, and a plumbing fixture set against said wall, a temporary protective covering member of heavy waterproof paper superposed on said fixture and conforming in outline to said fixture, and a marginal strip of an adhesive substance engaging the surface of the fixture and securing the covering member thereto spaced from the wall so that there is left exposed a portion of the surface of the fixture next to the surface of the wall of a width substantially equal to the thickness of the finish work to be applied to said wall.

13. In a building structure having a rough wall, and a plumbing fixture set against said wall, a temporary protective covering member superposed on said fixture and conforming in outline to said fixture, and a marginal strip of an adhesive substance securing edge portions of the covering member to the fixture and spaced from the wall so as to leave exposed a strip of the surface of the fixture of substantially the thickness of the finish work to be applied to said wall.

GEORGE W. HALL.